(No Model.)  G. N. VAN DERHOEF.  5 Sheets—Sheet 1.
GEAR CUTTING MACHINE.

No. 547,944.  Patented Oct. 15, 1895.

Fig. 1.

WITNESSES:

INVENTOR
George N. Vanderhoef
BY
Philipp Munson Phelps
ATTORNEYS (No Model.) 5 Sheets—Sheet 3.

G. N. VAN DERHOEF.
GEAR CUTTING MACHINE.

No. 547,944. Patented Oct. 15, 1895.

Fig. 3.

WITNESSES:
Arthur L. Kint
T. F. Kehoe

INVENTOR
Geo. N. Van Derhoef
BY
Philipp Munson & Phelps
ATTORNEYS

(No Model.) 5 Sheets—Sheet 4.

G. N. VAN DERHOEF.
GEAR CUTTING MACHINE.

No. 547,944. Patented Oct. 15, 1895.

WITNESSES:
Arthur Stuart
T. F. Kehoe

INVENTOR
Geo. N. VanDerhoef

BY
Philipp Munson & Philipp
ATTORNEYS

UNITED STATES PATENT OFFICE.

GEORGE N. VAN DERHOEF, OF NEW YORK, N. Y.

GEAR-CUTTING MACHINE.

SPECIFICATION forming part of Letters Patent No. 547,944, dated October 15, 1895.

Application filed May 28, 1894. Serial No. 512,690. (No model.)

*To all whom it may concern:*

Be it known that I, GEORGE N. VAN DERHOEF, a citizen of the United States, residing at New York, county of New York, and State of New York, have invented certain new and useful Improvements in Gear-Cutting Machines, fully described and represented in the following specification and the accompanying drawings, forming a part of the same.

The invention relates to gear-cutting machines of that class which form the teeth of gear-wheels by removing the metal or other material from between adjoining teeth by passing a revolving milling-cutter across the periphery of the gear-blank, and more particularly to machines of that class in which the cutter is first caused to pass across the face of the gear-blank, removing the material from between two adjacent teeth, and is then caused to return through the cut to its original position, after which the gear-blank is caused to rotate a distance equal to the distance between the centers of two adjacent teeth, or any multiple of such distance, preparatory to the cutting of another tooth-space, these several operations all being performed automatically, the machine after it is once started cutting all the teeth of the gear without further attention.

Some of the objects of the invention are to provide an indexing mechanism by which all inaccuracies in spacing shall be avoided, to provide for a slow-cutting stroke and an automatic quick return of the cutter, and to provide, generally, a machine of the class named which shall be quick and accurate and entirely automatic in its action.

As a full understanding of the invention can best be given by a full description of a machine embodying the invention, all further preliminary description will be omitted and a description of such a machine embodying the invention in a preferred form will now be given, and the features of the invention will then be specifically pointed out in the claims.

Reference is to be had to the accompanying drawings, forming part of this specification, in which—

The frame or bed of the machine is in the form of a column A, with an outspreading base B, and having at its upper end an overhanging arm C, preferably made separate from the column A and bolted to it, as shown. The arm C carries at its outer end a vertical plate D.

On one side of the column A is a dovetailed guide or way 10, on which is mounted the work-spindle carriage 11, which may be raised or lowered by means of a screw 12, which is shown as operated by means of a stud 13, with a squared end to receive a key, and having a bevel-gear to engage a similar gear on the end of the screw 12. The carriage 11 is securely clamped at any desired height by means of nuts 14, which draw on a clamping-piece 15. The work-spindle 16 is mounted in bearings on the carriage 11 and is bored at its forward end to receive the mandrel 2, bearing the gear-blank 3 to be cut in the customary manner in this class of machines, and carries at its rear end an index worm-wheel 17, which meshes with a worm 18 on the splined worm-shaft 19. The shaft 19 is provided with a bevel-gear 20, which meshes with a bevel-gear 21 on a shaft 22, having spur-gear 23, which is driven as hereinafter set forth.

Figure 1:
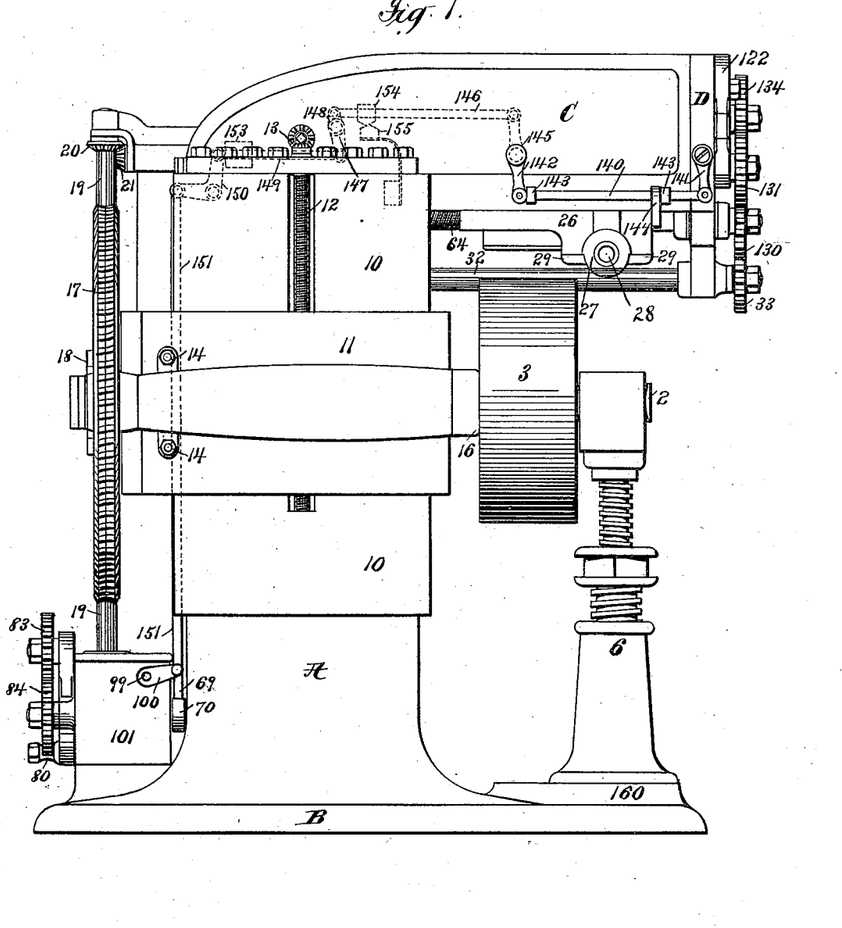
Figure 1 is a side elevation of the machine.
Figure 2:
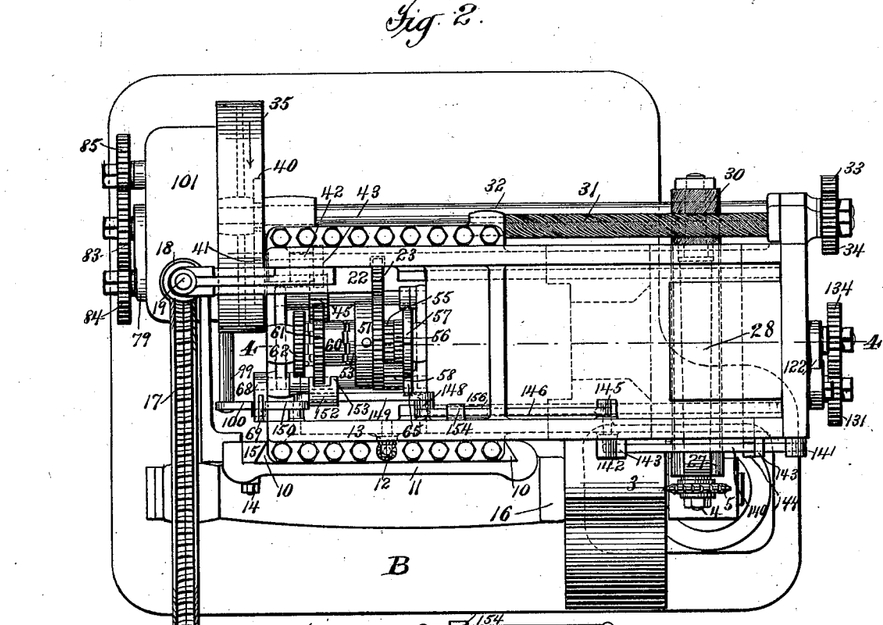
Fig. 2 is a top plan view of the machine.
Figure 3:
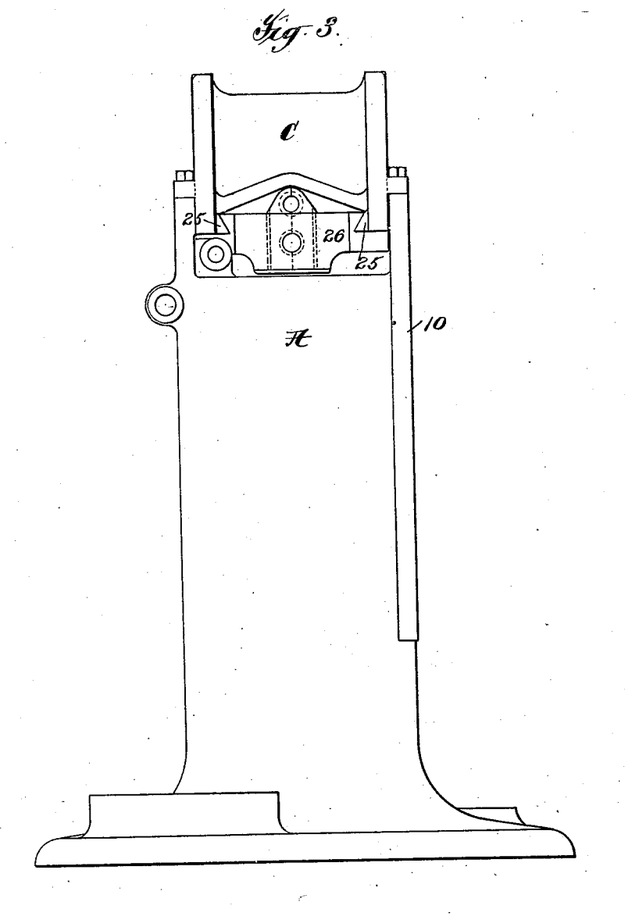
Fig. 3 is a rear elevation, parts being removed, but showing how the cutter-slide is mounted and the yoke carried thereby, in which is mounted the feed-screw nut.
Figure 4:
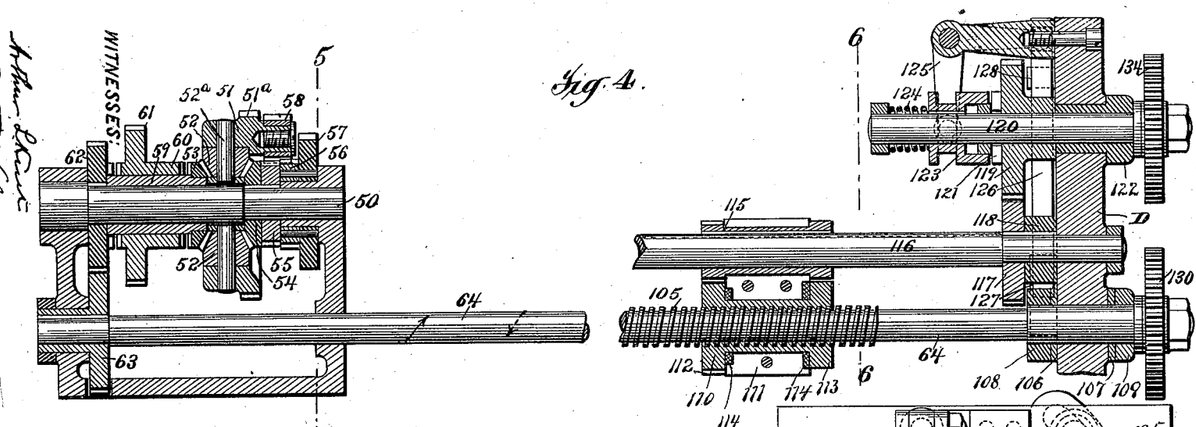
Fig. 4 is a longitudinal section of the indexing and feed-screw-shaft-driving mechanism and differential-feed mechanism on line 4 of Fig. 2.
Figure 5:
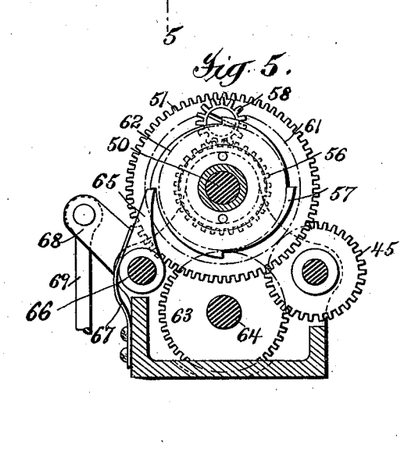
Fig. 5 is a section on line 5 of Fig. 4.

The overhanging arm C is provided with ways 25, on which is mounted the cutter-slide 26, which carries the cutter-spindle box 27, in which is mounted the cone-shaped cutter-spindle 28, the slide being preferably recessed to receive the spindle-box, and the spindle-box being secured by clips 29, tightened by means of screws or bolts. By loosening the clips the spindle-box may be moved to provide for endwise adjustment of the cutter. The spindle 28 is bored at one end to receive the mandrel 4, carrying the cutter 5, as is common in milling-machines. The other end of the spindle is provided with a spiral gear 30, meshing with and driven by a spiral gear or worm-shaft 31. This arrangement of spiral gears for driving the cutter permits of an endwise adjustment of the cutter-spindle and a reciprocating movement of the cutter-slide, each spiral gear being free to roll on the other. The shaft 31 is driven by the main driving-shaft 32, through gears 33 and 34 on said shafts, said gears being preferably change gears to provide for varying the speed of rotation of the cutter. The driving-shaft 32 carries a driving-pulley 35, by which it is rotated in the direction of the arrow in Fig. 2. The main driving-shaft 32 is also provided with a spur-gear 40, which meshes with gear 41 on the shaft 42, said shaft also carrying the gear 43, which drives the broad-faced gear 45, by which is driven the indexing and feed-screw-shaft-driving mechanism shown in detail in Figs. 4 and 5, and which will now be described. On the shaft 50 of the said mechanism is loosely mounted a sleeve 51, provided with a gear 51$^a$, which meshes with the gear 23, carried by the shaft 22, and on which are rotatably mounted one or more pinions which engage gears on opposite sides of the centers of the pinions by which the pinions are rotated. In the construction shown bevel-pinions 52 are used, and they engage bevel-gears 53 and 54 on either side of the sleeve 51, these pinions being mounted inside the sleeve 51 on studs 52$^a$ carried thereby, and this construction employing bevel-pinions and gears will probably be found preferable. Mounted on the shaft 50, next to the bevel-gear 54, is the spur-gear 55, both being fast on the shaft 50. Beyond the gear 55 is loosely mounted, concentric with the shaft 50, and, as shown, on a sleeve in which one end of said shaft is mounted, a sleeve having a ratchet-wheel 57 and a gear 56, having a greater number of teeth than the gear 55. The gear 56 has preferably one more tooth than the gear 55. Mounted on a stud extending from the face of the sleeve 51 is a pinion 58, which meshes with the teeth of both the gears 55 56. By this construction if the gear 56 be held stationary and the sleeve 51, carrying the pinion 58, be caused to rotate, the gear 55 and the shaft 50 will be given a slow rotation in the opposite direction from the rotation of the sleeve 51. When the gears 55 and 56 differ by more than one or two teeth, the pinion 58 should be made with two parts of different diameters to mesh properly with the gears of different diameters.

The bevel-gear 53 is carried by a sleeve 59, loosely mounted on the shaft 50, and has one face formed with clutch-teeth. Fast on the shaft 50, beyond the sleeve 59, is a gear 62, which is also provided with clutch-teeth. Loosely mounted on the sleeve 59 is the sleeve 60, having clutch-teeth at each end capable of engaging with either the clutch-teeth on the bevel-gear 53 or those on the gear 62, and provided with a gear 61, which meshes with the broad-faced gear 45. The sleeve 60 is of such a length that it can freely rotate on the sleeve 59 without engaging the clutch-teeth at either end when in the position shown in Figs. 2 and 4. The gear 62 meshes with a gear 63, fast on the feed-screw shaft 64.

A pawl 65, carried by a shaft 66, engages the ratchet-wheel 57, being spring-pressed by a spring 67. The other end of shaft 66 carries a crank-arm 68, which is connected by a link 69 to a crank-arm 70, carried by a sleeve 71 of the index change-gear and locking mechanism, shown in detail in Figs. 7 and 8, and which will now be described.

The worm-shaft 19 carries at its lower end a bevel-gear 75, which meshes with a bevel-gear 76 on the end of a shaft 77, which is mounted in the sleeve 78 of the change-gear yoke 79. The change-gear yoke 79 is of the usual form, being secured in position by a tightening-screw 80, and having a slot 81, in which is adjustably secured a stud 82, carrying a change-gear 83, which is driven by a change-gear 84, carried by the shaft 77, and which in turn drives a change-gear 85, carried by a shaft 86. The shaft 86 is provided with a gear 87, fast thereon, and with a sleeve 88, loose thereon, which sleeve carries a gear 89 and a disk or latch plate 90, having projecting lugs 91 92. Gear 87 meshes with a gear 93, carried by a sleeve 94, loosely mounted on a shaft 95, which shaft also carries the sleeve 71, which is also loosely mounted thereon and is provided with a projecting lug 96. The sleeve 94 has gear-teeth on a portion of its length which mesh with the teeth of the gear 89. The sleeve 88 is free to slide on the shaft 86 and is spring-pressed in one direction by a spring 97 and is moved in the other direction by a spring hook or catch 98, carried by a crank-arm 98$^a$ on a rock-shaft 99, which also carries a crank-arm 100, operated as hereinafter set forth. The shafts 86 95 99 and the sleeve 78 are mounted in suitable bearings, preferably in a box or frame 101, as shown in the drawings. A stop 102 on the box 101 is so positioned as to lie in the path of rotation of the lug 91 when the sleeve 88 is in normal position and out of the path of the lug 91 when the sleeve 88 is retracted by the spring-catch 98, and lug 96 is in the path of the lug 92 when the sleeve is in its normal position and out of the path of the said lug when the sleeve is retracted by the spring-catch 98.

Figure 6:
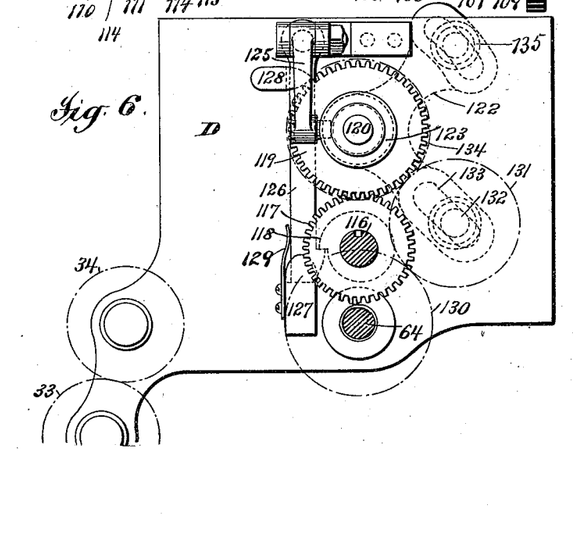
Fig. 6 is a section on line 6 of Fig. 4.

The feed-screw shaft 64 extends forward to and has a bearing in plate D (see Figs. 4 and 6) and is provided for a portion of its length with a screw-thread or threads 105. Thrust-collars 106 and 107, of fiber or other suitable material, are held between plate D and collars 108 and 109, fast on the shaft 64. On the threaded portion of the shaft 64 is the rotary feed-screw nut 110, which is rotatably mounted in a yoke 111, carried by the cutter-slide 26. The rotary nut 110 is preferably formed with collars or flanges 112 113, and the thrust of the said nut on the nut-yoke 111 is taken by thrust-collars 114. The flange 112 is provided with gear-teeth which mesh with gear-teeth on one of the flanges of a sliding driving-sleeve 115, also rotatably mounted in the nut-yoke 111 and free to slide on the splined shaft 116, by which it is driven, and which shaft has fast thereon a gear 117 and ratchet-wheel 118. The gear 117 meshes with the gear 119, loosely mounted on a jack-shaft 120 and held in place by a collar 121, the jack-shaft being shown as loosely mounted in the sleeve of the change-gear yoke 122. Splined to the shaft 120 and free to slide thereon is the clutch-sleeve 123, provided with clutch-teeth to engage clutch-teeth on the face of the gear 119. The clutch-sleeve 123 is spring-pressed by spring 124 toward the gear 119, and is moved against the tension of the spring by a bell-crank lever 125, which carries a stud entering a peripheral recess in said clutch-sleeve. The other arm of the bell-crank lever 125 is engaged by a sliding pawl 126, positioned to be engaged by the ratchet-wheel 118, so that when the said ratchet-wheel is rotated in one direction the clutch-sleeve 123 will be thrown out of engagement with the gear 119, and when the ratchet-wheel is rotated in the other direction the clutch-sleeve 123 may be thrown into engagement with gear 119 by the spring 124. The sliding pawl 126 is held to the plate D by clips 127 and 128, one of which 127 acts as a stop to limit the movement of the pawl in one direction, and the pawl is spring-pressed against the ratchet-wheel 118, as by a spring 129. The shaft 64 carries a change gear 130, which meshes with a change-gear 131, carried by a stud 132, adjustable in a slot 133 in the change-gear yoke 122, the change-gear 131 meshing with and driving a change-gear 134, carried by the jack-shaft 120. The sleeve of the yoke 122 is mounted in the plate D and the yoke is secured in position by a set-screw 135.

Any suitable mechanism may be employed for automatically shifting the clutch-sleeve 60 and rocking the rock-shaft 99; but I have devised such a mechanism actuated by the movement of the cutter-slide 26, which is preferred, and which will now be described.

A horizontal rod 140, hung on links 141 142, pivoted to the overhanging arm C, is provided with collars 143, adjusted to be engaged by a dog 144, carried by the cutter-slide 26. The link 142 forms one arm of a lever 145, the other arm of which is pivoted to a horizontal rod 146, which rod actuates a lever 147, pivoted at 148 and also pivoted to a rod 149, which is pivoted at its other end to one arm of a bell-crank lever 150. The other arm of the bell-crank lever 150 has pivoted to it a link or connecting-rod 151, which is pivoted at its other end to crank-arm 100. The rod 149 carries a block 152, having lugs or arms 153, which extend on each side of the gear 61, carried by the clutch-sleeve 60.

It is desirable in shifting the clutch-sleeve 60 that it be moved into engagement by a yielding pressure. With this object in view the lugs 153 are set far enough apart so that the clutch-teeth on one end of the clutch-sleeve 60 will not be moved out of engagement until the block 152 has completed more than one-half its movement, in order that a suitable spring-pressure device may be brought into play to complete the movement of the clutch-sleeve. I have shown a spring-pressure device consisting of a block 154, carried by the rod 146, and having suitably-inclined faces to be engaged by the inclined faces of a block 155, spring-pressed, as by a spring 156, against the block 154. By this means, when the rod 146 has been moved far enough to carry the center or apex of the block 154 past the center of the block 155, similarly-inclined faces of the two blocks will be brought into engagement, and the pressure on the block 155 will tend to give a horizontal movement to the block 154, carried by the horizontally-moving-rod 146, thereby completing the movement of the rod 146 and of the rod 149, carrying the block 150, by which the clutch-sleeve is shifted.

To provide for supporting the outer end of the mandrel 2, carrying the gear-blank 3, I form at the proper place on the base of the machine a pad or boss 160, on which to place a suitable support, preferably a screw-jack 6, such as is commonly used in machine-shops.

Figure 7:
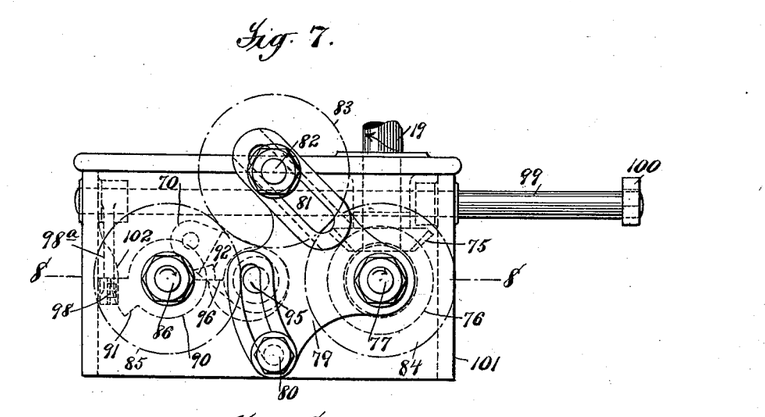
Fig. 7 is an elevation of the index change-gear and locking mechanism, the position of the parts being taken at a different time in the operation of the machine than the preceding views.
Figure 8:
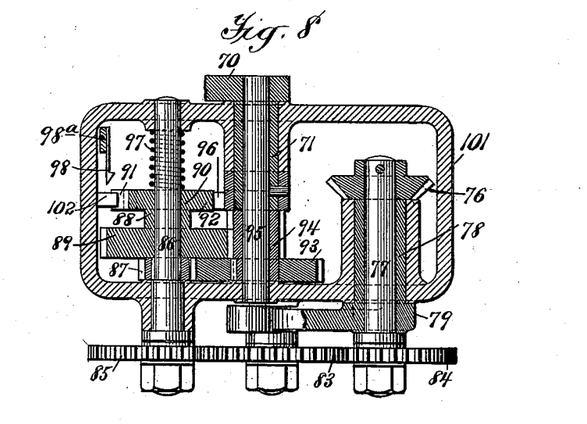
Fig. 8 is a horizontal section on line 8 of Fig. 7.
Figure 9:
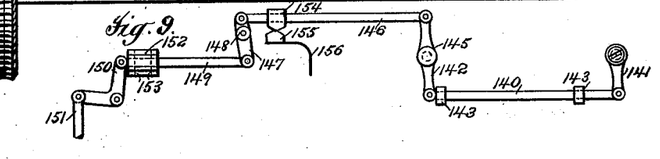
Fig. 9 shows the shifting mechanism operated by the cutter-slide.

In Figs. 7 and 8 the position of the parts shown is that taken after the setting of the latch-plate 90 on the completion of the indexing at the beginning of the cutting-stroke of the cutter-slide, these parts remaining in this position until the dog 144, carried by the cutter-slide, engages the collar 143 to throw the shifting mechanism at the end of the return stroke of the cutter-slide. In the other views the different parts are shown in the positions taken after the completion of the return stroke of the cutter-slide and before the commencement of the cutting-stroke, the clutch-sleeve 60 being in position to rotate freely on the sleeve 59 between the gears 62 and 53, not being in engagement with either.

The operation of the machine is as follows: The main driving-shaft 32 is driven by the pulley 35 and, by means of the gears 33 and 34, drives the spiral gear or worm-shaft 31, which, meshing with the spiral gear 30, rotates the cutter-spindle 28. The clutch-sleeve 60 is continuously driven by its gear 61, meshing with the broad-faced gear 45, which, in turn, is driven by the gear 40 on the main driving-shaft 32, through the gears 41 and 43. If, now, the clutch-sleeve 60 be shifted to engage the bevel-gear 53, the bevel-gear 53 will be caused to rotate, and it will rotate the pinions 52, carried by the sleeve 51, and, since the gear 56 is held from rotation by the ratchet-wheel 57 being engaged by the pawl 65, and the bevel-gear 54 is held from rotation by the gear 55 being locked to the gear 56 by the pinion 58, the pinions 52 will roll on the bevel-gear 54, thereby rotating the sleeve 51 and its gear 51ª. As the sleeve 51 rotates, the pinion 58, carried thereby, will roll on the gears 55 and 56, and since the gear 55 has a less number of teeth than the gear 56, it will be very slowly rotated in a direction opposite to the direction of the gear 61 and the bevel-gear 53, thereby slowly rotating the shaft 50. The gear 51ª, meshing with the gear 23, drives the shaft 22 and the worm-shaft 19 and the index worm-wheel 17, thereby rotating the gear-blank 3, carried by the work-spindle 16 and the worm-shaft 19 through its bevel-gear 75, and the bevel-gear 76 rotates the shaft 77, which, through the change-gears 84 83 85, rotates the shaft 86, which, through the gears 87 and 93, rotates the sleeve 94, which drives the gear 89, thereby rotating the sleeve 88 and its latch-plate 90. The rotation of the gear-blank will be continued until the lug 91 on the latch-plate 90 strikes against the stop 102, by which further movement of the parts, including the sleeve 57 and gear 51ª, will be prevented. Just before the lug 91 strikes the stop 102, the lug 92 will have engaged the lug 96, carried by the sleeve 71, and rotated the sleeve 71 sufficiently to withdraw the pawl 65 from engagement with the ratchet-wheel 57 by means of the link 69, connecting the crank-arm 70 with the crank-arm 68. The sleeve 51 being now held against rotation and the ratchet-wheel 57 and its gear 56 being free to rotate, the bevel-gear 54 and the shaft 50 will be rotated by the bevel-gear 53, through the pinions 52, in a direction opposite to the rotation of the gear 61. Since the pinions 52, carried by the gear 53, act as levers between the bevel-gears 53 and 54, the sleeve 51 and its gear 51ª will be held under tension to rotate in the direction in which it moves when the bevel-gear is held against rotation, and, since it cannot rotate in that direction by reason of the locking of the latch-plate 90, the connecting-gearing will be held under tension and firmly pressed against each other, thereby avoiding all inaccuracies of spacing due to backlash in the index-change gears or any of the gears driving said change-gears. This is a very important feature of the invention. The rotation of the shaft 50, through the gears 62 and 63, rotates the feed-screw shaft 64 in the direction indicated by the arrow in full lines thereon in Fig. 4. As hereinbefore explained, while the gear 56 is held against rotation, the shaft 50, and thereby the shaft 64, will be given a very slow rotation, due to the rolling of the pinion 58 on the gear 56 and on the gear 55, fast on the shaft 50, the gear 55 having a less number of teeth than the gear 56. By this construction the cutter-slide is started on its cutting-stroke before the latch-plate strikes its seat, thus relieving the gears composing the indexing mechanism from the shock of putting into rapid motion from rest the large mass of the cutter-slide and its accessories. In small machines, in which the mass of the cutter-slide is quite small, it may be desirable, as being simpler, to connect the ratchet-wheel 57 directly to the bevel-gear 54, doing away with the gears 55 and 56 and the pinion 58. In that case the cutter-slide will not be started until the ratchet-wheel is released and the latch-plate has struck its seat; otherwise the operation will be the same. The rotation of the feed-screw shaft 64, through the change-gears 131 134, rotates the jack-shaft 120. As the feed-screw shaft starts to rotate, it tends to rotate the feed-screw nut 112, which, through the sliding sleeve 115, gives a tendency to rotate to the shaft 116, thus allowing the sliding pawl 126 to be drawn up, thereby permitting the spring 124 to force the teeth of the clutch 123 into engagement with the teeth on the gear 119, loose on the jack-shaft 120. The gear 119 will thus be caused to rotate the splined shaft 116 and the sliding nut 115, and the feed-screw nut 112 will thereby be rotated in the same direction as the feed-screw shaft 64. The gears are so timed as to give the nut 112 a rate of rotation somewhat less that the rotation of the shaft 64. The feed-screw nut 112 will thus be advanced by the feed-screw 105 at a rate equal to the difference between its rotation and the rotation of the feed-screw shaft 64, thereby moving the cutter-slide for its cutting-stroke. When the cutter-slide has completed its cutting-stroke, the dog 144 engages one of the collars 143, thereby throwing the rod 140, by which the rod 146, carrying the block 154, and the rod 149, carrying the block 152, are moved, until the apex of the block 154 passes the apex of the spring-pressed block 155, when the movement of the rods 146 and 149 will be completed by the block 155 pressing on the inclined face of the block 154. During the latter part of the movement of the block 152, carried by the rod 149, one of its arms 153 will engage and move the clutch 60 out of engagement with the teeth of the bevel-gear 53 and into engagement with the teeth of the gear 62, thereby rotating the shaft 50 and the feed-screw shaft 64 in the opposite direction to their former rotation, as indicated by the arrow in dotted lines. The direction of rotation of the shaft 116 will thereby be reversed, and the ratchet-wheel 118, engaging the sliding pawl 126, will draw the clutch out of engagement with the gear 119, and at the same time prevent further rotation of the shaft 116. Sliding sleeve 115 being thus held against rotation, the rotary feed-screw nut 110 will thereby be held against rotation and will be carried back by the screw 105 at a rate in accordance with the pitch of the screw 105 and its speed, thus providing for a quick return stroke of the cutter-slide 26. There is thus provided a differential feed during the cutting-stroke, the speed depending on the change-gears chosen, and a constant quick return independent of the change-gears used; and this is an important feature of the invention.

During the return stroke of the cutter-slide all the gears of the index mechanism will still be held under tension, as the bevel-gear 54 will be rotated by the shaft 50 in the same direction as the bevel-gear 53 was before rotated, and the gear 51 will thereby be held under tension to rotate in the same direction in which it rotates during the indexing, and will still be prevented from rotating by the engagement of the lug 91 with the stop 102. When the shifting mechanism is thrown at the end of the rearward or cutting movement of the cutter-slide, the shaft 99 will be rocked through the bell-crank lever 150, link 151, and crank-arm 100, and the spring-catch 98 will be thereby thrown forward to engage the lug 91 of the latch-plate 90, and as the shifting mechanism is thrown at the end of the forward or return movement of the cutter-slide the shaft 99 will be rocked in the opposite direction, whereby the spring-catch 98 will be drawn back, and it being in engagement with the latch-plate 91 will move the latch-plate and the sleeve 88, by which the said latch-plate is carried against the tension of the spring 97, so as to disengage the lug 91 from the stop 102 and to disengage the lug 92 from the lug 96 to allow the spring 67 to force the pawl 65 again into engagement with the ratchet-wheel 57 preparatory to another movement of the indexing mechanism. The sleeve 88 will be held in this position until during the next indexing movement the latch-plate has rotated far enough to carry the lug 91 out of engagement with the spring-catch 98, when the sleeve 88 will be returned to its normal position by the spring 97, so that the lugs 91 and 92 of the latch-plate may again engage the stop 102 and the lug 96, respectively, after one revolution thereof.

The amount of rotation of the worm-shaft 19 and thereby of the index-wheel 17 is regulated by changing the change-gears 84, 83, and 85, and these gears may be changed so as to provide for cutting any desired number of teeth in the blank-gear. Changing the change-gears 130, 131 and 134, connecting the jack-shaft 120 and the feed-screw shaft 64, provides for increasing or decreasing the difference in rotation between the shafts 64 and 116 and thus varying the rate of speed, the gears always being arranged so that the sleeve 115 shall have a slower rate of rotation than the nut 110.

It will be understood that although the machine here described is primarily intended for cutting the teeth of gear-wheels, yet various features of the invention may be advantageously employed in other milling-machines, or in any machine in which they may perform their respective functions.

Various changes and modifications in the construction and arrangement of the parts of the machine here shown and described will suggest themselves to one skilled in the art and may be made without departing from the spirit of the invention, and it will be understood that such modifications are covered by the claims.

What is claimed is—

1. The combination of a reciprocating slide, a spindle mounted on said slide, a spiral gear on said spindle, a driving spiral gear meshing with the spiral gear on the spindle and held against endwise movement, said driving spiral gear having a driving face extending parallel to the line of movement of said slide and of a length equal to or greater than the movement of the slide, means for reciprocating said slide independently of the spiral gears, and means for actuating said driving spiral gear, substantially as described.

2. The combination of a reciprocating cutter slide, a cutter spindle mounted in a box adjustable transversely of the cutter slide, a spiral gear on said cutter spindle, a spiral gear extending parallel to the line of movement of said cutter slide and meshing with the spiral gear on the cutter spindle, and means for driving the second said gear and for reciprocating the cutter slide, substantially as described.

3. In a differential feed mechanism, the combination of a feed screw, a nut on said feed screw, and automatically operating means for rotating the nut in the same direction as, but at a different rate of speed from the feed screw when the feed screw rotates in one direction, and for holding it against rotation when the feed screw rotates in the opposite direction, substantially as described.

4. In a differential feed mechanism, the combination of an automatically reversible feed screw, a nut on said feed screw, connections between the feed screw and the nut whereby the nut is rotated by the feed screw when the feed screw rotates in one direction, and an automatically operating locking mechanism for holding the nut from rotating when the feed screw rotates in the opposite direction, substantially as described.

5. In a differential feed mechanism, the combination of a feed screw, a nut on said feed screw, a sleeve driving said nut and sliding on its driving shaft, said shaft, and means for rotating said shaft to rotate the nut in the same direction as, but at a different rate of speed from the feed screw, when the feed screw rotates in one direction, and for holding said shaft against rotation when the feed screw rotates in the opposite direction, substantially as described.

6. In a differential feed mechanism, the combination of a feed screw, a nut thereon, a gear on said nut, a sleeve sliding on its driving shaft and having a gear which meshes with the gear on the nut, said shaft, a train of gears between the feed screw and said shaft including a clutch, means for throwing the clutch into engagement to cause said shaft to rotate when the feed screw rotates in one direction, and for throwing said clutch out of engagement and for holding said shaft against rotation when the feed screw rotates in the opposite direction, substantially as described.

7. In a differential feed mechanism, the combination of a feed screw, a nut thereon, a gear on said nut, a sleeve sliding on its driving shaft and having a gear which meshes with the gear on the nut, said driving shaft, a jack shaft driven by the feed screw shaft, a gear loose on said jack shaft and meshing with a gear on said driving shaft, a clutch to connect said loose gear with the jack shaft, and means for throwing said clutch into engagement when the feed screw rotates in one direction, and for throwing said clutch out of engagement and for holding the driving shaft against rotation when the feed-screw rotates in the opposite direction, substantially as described.

8. In a differential feed mechanism, the combination of a feed screw, a nut thereon, a gear on said nut, a sleeve sliding on a splined shaft and having a gear which meshes with the gear on the rotary nut, said splined shaft, a jack shaft driven by and in the same direction as the feed screw shaft, a gear loose on said jack shaft and meshing with a gear on said splined shaft, a clutch to connect said loose gear with the jack shaft, a spring for throwing said clutch into engagement, a ratchet wheel on said splined shaft, a pawl operated by said ratchet wheel, and connections between said pawl and said clutch whereby when said splined shaft rotates in one direction, the clutch will be moved out of engagement, substantially as described.

9. An indexing mechanism having an indexing wheel driven by a rotary sleeve on which are mounted one or more pinions which act as levers to rotate the sleeve during the indexing and to hold the sleeve under tension when it is prevented from rotating, a driving gear on one side of the centers of said disks, a driven gear on the other side of said centers, and means for holding said last mentioned gear against rotation during the indexing, substantially as described.

10. The combination of a driving sleeve, one or more pinions rotatably mounted on said sleeve, gears meshing with said pinions on either side of their centers, means for holding the gear on one side against rotation, and means for releasing said last mentioned gear and for locking said sleeve against rotation, substantially as described.

11. The combination of a driving sleeve, a shaft on which said sleeve is loosely mounted, one or more pinions rotatably mounted on said sleeve, gears on said shaft and meshing with said pinions on either side of their centers, means for driving one of said gears, means for holding the other of said gears against rotation, and means for releasing said last mentioned gear and for holding said sleeve against rotation, substantially as described.

12. The combination of a driving sleeve, a shaft on which the sleeve is loosely mounted, one or more pinions rotatably mounted on said sleeve, a gear on said shaft and meshing with said pinions on one side of their centers, a second gear on said shaft and meshing with said pinions on the other side of their centers, means for driving first one of said gears and then the other, means for holding said second gear against rotation during a part of the time in which said first gear is driven, means for releasing said second gear and for holding said sleeve against rotation during the remainder of the time in which said first gear is driven and while said second gear is driven, substantially as described.

13. The combination of a driving sleeve, one or more pinions rotatably mounted on said sleeve, gears meshing with said pinions on either side of their centers, means for holding the gear on one side against rotation, and means controlled by the rotation of said sleeve for releasing said last mentioned gear and for locking said sleeve against rotation, substantially as described.

14. The combination with an indexing wheel, of a sleeve by which the indexing wheel is driven, a shaft on which the sleeve is loosely mounted, one or more pinions rotatably mounted on said sleeve, a gear on said shaft and meshing with said pinions on one side of their centers, a second gear on said shaft and meshing with said pinions on the other side of their centers, means for driving first one of said gears and then the other, means for holding said second gear against rotation during a part of the time in which said first gear is driven, means controlled by the rotation of said sleeve for releasing said second gear and for holding said sleeve against rotation during the remainder of the time in which said first gear is driven and while said second gear is driven, substantially as described.

15. The combination with a shaft having a driving gear fast thereon, and with an indexing wheel, of a sleeve by which the indexing wheel is driven rotatably mounted on said shaft, one or more bevel pinions rotatably mounted on said sleeve, a bevel gear loose on said shaft and meshing with said pinions on one side of said sleeve, a bevel gear fast on said shaft and meshing with said pinions on the other side of said sleeve, a rotating clutch sleeve loose on said shaft and having clutch teeth adapted to engage with clutch teeth on said driving gear and on said loose bevel gear, means for throwing said clutch sleeve into engagement with said loose bevel gear, means for holding said shaft against rotation, means for releasing said shaft and for holding said sleeve carrying the pinions against rotation, and means for shifting said clutch sleeve to engage said driving gear, substantially as described.

16. The combination with a cutter slide reciprocating mechanism and an indexing wheel, of a shaft by which the cutter slide reciprocating mechanism is driven, a sleeve by which the indexing wheel is driven rotatably mounted on said shaft, one or more bevel pinions rotatably mounted on said sleeve, a bevel gear loose on said shaft and meshing with said pinions on one side of said sleeve, a bevel gear fast on said shaft and meshing with said pinions on the other side of said sleeve, a rotating clutch sleeve having clutch teeth adapted to engage with clutch teeth on said shaft and on said loose bevel gear, means controlled by said cutter slide whereby said clutch sleeve is thrown alternately into engagement with said loose bevel gear and with said shaft at the end of each reciprocation of said cutter slide, means for holding said shaft against rotation when said clutch sleeve is in engagement with said loose bevel gear, and means controlled by the rotation of said sleeve carrying the pinions for releasing said shaft and for holding said sleeve carrying the pinions against rotation, substantially as described.

17. The combination with a driving shaft, of a sleeve rotatably mounted on said shaft, one or more bevel pinions rotatably mounted on said sleeve, a bevel gear loose on said shaft and meshing with said bevel pinions on one side of their centers, a bevel gear fast on said shaft and meshing with said pinions on the other side of their centers, a spur gear fast on said shaft, a loose spur gear concentric with said shaft and having a different number of teeth from said fast spur gear, a pinion carried by said sleeve and meshing with both said spur gears, means for holding said loose spur gear against rotation, and means for rotating said loose bevel gear, substantially as described.

18. The combination with a driving shaft, of a sleeve rotatably mounted on said shaft, one or move bevel pinions rotatably mounted on said sleeve, a bevel gear loose on said shaft and meshing with said bevel pinions on one side of their centers, a bevel gear fast on said shaft and meshing with said bevel pinions on the other side of their centers, a spur gear fast on said shaft, a loose spur gear concentric with said shaft and having a greater number of teeth than said fast spur gear, a pinion carried by said sleeve and meshing with both said spur gears, means for rotating said loose bevel gear, means for holding said loose spur gear against rotation, and means for releasing said loose spur gear and for holding said sleeve against rotation, substantially as described.

19. The combination with a driving shaft, of a bevel gear loose thereon, a bevel gear fast thereon, one or more pinions mounted between and meshing with both said bevel gears, a rotating clutch sleeve having clutch teeth on each end and loose on said shaft, and means for throwing said clutch sleeve alternately into engagement with said loose bevel gear and with said shaft, substantially as described.

20. The combination with a driving shaft, of a sleeve rotatably mounted on said shaft, one or more bevel pinions rotatably mounted on said sleeve, a bevel gear loose on said shaft and meshing with the pinions on one side of said sleeve, a bevel gear fast on said shaft and meshing with the pinions on the other side of said sleeve, a rotating clutch sleeve having clutch teeth on each end and loose on said shaft, means for throwing said clutch sleeve alternately into engagement with said loose bevel gear and with said shaft, and means for holding said sleeve carrying the pinions against rotation, substantially as described.

21. The combination of a driving mechanism, a locking mechanism, a train of gearing connecting said locking mechanism with said driving mechanism, an indexing wheel driven by a gear intermediate between said locking mechanism and said driving mechanism, and means for holding said driving mechanism under tension to rotate after the locking of said locking mechanism, substantially as described.

22. The combination with a shaft 50, sleeve 51, pinions 52 carried by sleeve 51, gear 53 loose on said shaft and meshing with said pinions on one side of said sleeve, gear 54 fast on said shaft and meshing with said pinions on the other side of said sleeve, gear 55 fast on said shaft, gear 56 concentric with said shaft and free to rotate, pinion 58 carried by sleeve 51 and meshing with both gear 55 and gear 56, ratchet wheel 57 fast to gear 56, pawl 65 engaging said ratchet wheel, means for rotating gear 53, latch plate 90 rotated by sleeve 51 and by the seating of which sleeve 51 is held against rotation, and said latch plate having a lug adapted to engage a lug on a rock shaft just before the seating of said latch plate, connections between said rock shaft and the pawl 65 whereby when the rock shaft is rocked the pawl will be drawn out of engagement with the ratchet wheel 57, substantially as described.

23. The combination of a sleeve, one or more pinions rotatably mounted thereon, a driving gear meshing with said pinions on one side of their centers, a second gear meshing with said pinions on the other side of their centers, a latch plate adapted to seat against a stop, a train of gearing connecting said latch plate with said sleeve, an indexing wheel driven by said sleeve, means for holding said second gear against rotation, and means controlled by said latch plate whereby said second gear is released prior to the seating of said latch plate, substantially as described.

24. The combination of a sleeve, one or more pinions rotatably mounted thereon, a driving gear meshing with said pinions on one side of their centers, a second gear meshing with said pinions on the other side of their centers, a latch plate adapted to seat against a stop, a train of gearing connecting said latch plate with said sleeve, an indexing wheel driven by a gear intermediate between said sleeve and said latch plate, means for holding said second gear against rotation, and means controlled by said latch plate whereby said second gear is released prior to the seating of said latch plate, substantially as described.

25. The combination of a sleeve, one or more pinions rotatably mounted thereon, a driving gear meshing with said pinions on one side of their centers, a second gear meshing with said pinions on the other side of their centers, a latch plate adapted to seat against a stop, a train of gearing connecting said latch plate with said sleeve and including a set of change gears, an indexing wheel driven by a gear intermediate between said sleeve and said latch plate, means for holding said second gear against rotation, means controlled by said latch plate whereby said second gear is released prior to the seating of said latch plate, means for moving said latch plate in an axial direction until clear of said stop, and means for returning said latch plate to its former position, substantially as described.

26. The combination of a rotatable latch plate, a stop against which said latch plate seats, means for moving said latch plate in an axial direction until clear of said stop, and means for returning said latch plate to its former position, substantially as described.

27. The combination of a rotatable latch plate, a stop against which said latch plate seats, means for moving said latch plate in an axial direction until clear of said stop, and means for automatically returning said latch plate to its former position after it has made a part of a revolution, substantially as described.

28. The combination with a cutter slide and an indexing mechanism, of means for advancing the cutter slide toward the work at a low rate of speed during the indexing and for advancing the cutter slide toward the work at an increased speed after the indexing is completed and before the cutter engages the work, substantially as described.

29. The combination with a cutter slide and its actuating mechanism, of an indexing mechanism held under tension during the movement of the cutter slide by a system of positive gearing whereby said tension is produced without loss of power, substantially as described.

30. The combination with a shaft having a gear and a ratchet wheel fast thereon, and a second shaft having a gear loose thereon and meshing with the gear on said first shaft, of a clutch on said second shaft adapted to connect said loose gear to said shaft, a pawl operated by said ratchet wheel and by which said clutch is moved out of engagement, and a spring tending to move said clutch into engagement, substantially as described.

31. The combination of a shaft 50, sleeve 51, pinions 52 carried by sleeve 51, gears 53 and 54 engaging said pinions, gears 55 and 56, pinion 58 carried by sleeve 51 and engaging gears 55 and 56, means for holding gear 56 against rotation, and means controlled by the rotation of sleeve 51 for releasing gear 56 and holding gear 51 against rotation, substantially as described.

32. The combination with a feed screw, of a feed screw nut 110 mounted in a yoke 111 and having a gear 112, driving sleeve 115 also mounted in yoke 111 and having a gear meshing with gear 112, a splined shaft on which sleeve 115 slides, and means for rotating said splined shaft in the opposite direction to the feed screw when the feed screw rotates in one direction, and for holding said splined shaft against rotation when the feed screw rotates in the opposite direction, substantially as described.

33. The combination of shaft 50, sleeve 51, pinions 52, gears 53 and 54, clutch sleeve 60, and means for holding sleeve 51 against rotation, substantially as described.

34. The combination of the gears 55 and 56, pinion 58 carried by a sleeve 51 and meshing with both said gears, and means for holding gear 56 against rotation and for releasing said gear, substantially as described.

In testimony whereof I have hereunto set my hand in the presence of two subscribing witnesses.

GEORGE N. VAN DERHOEF.

Witnesses:
T. F. KEHOE,
J. A. DUNN.